(12) United States Patent
Roychoudhury

(10) Patent No.: US 6,942,244 B2
(45) Date of Patent: Sep. 13, 2005

(54) COVER AND HOUSING STRUCTURE FOR AN AIRBAG MODULE

(75) Inventor: Raj S. Roychoudhury, Bloomfield Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 232 days.

(21) Appl. No.: 10/602,872

(22) Filed: Jun. 25, 2003

(65) Prior Publication Data

US 2004/0262889 A1 Dec. 30, 2004

(51) Int. Cl.[7] .............................................. B60R 21/20
(52) U.S. Cl. .................................................. 280/728.3
(58) Field of Search ........................... 280/728.3, 728.2, 280/731, 732

(56) References Cited

U.S. PATENT DOCUMENTS

| | | | | |
|---|---|---|---|---|
| 5,470,101 A | * | 11/1995 | Ennis ........................ | 280/728.3 |
| 5,520,411 A | * | 5/1996 | Lang et al. ............... | 280/728.3 |
| 6,039,342 A | * | 3/2000 | Sasaki ...................... | 280/728.3 |
| 6,199,899 B1 | * | 3/2001 | Krebs et al. .............. | 280/728.2 |
| 6,752,415 B2 | * | 6/2004 | Nelson et al. ........... | 280/728.3 |

* cited by examiner

*Primary Examiner*—Peter C. English
(74) *Attorney, Agent, or Firm*—Lonnie Drayer

(57) ABSTRACT

New and useful constructions for an airbag cover and housing, and new and useful assembly technique for coupling the airbag housing and cover to form an airbag module, are provided. According to the present invention an airbag cover and housing are configured so that the cover is tightly fit over the housing as the cover is coupled to the housing. The housing has an array of hooks and retainers, each formed in one piece with the housing. The hooks and retainers are oriented toward each other and are configured to: (a) enable the cover to be tightly fit over the housing; (b) capture a portion of the cover between the hooks and the retainers; (c) prevent over travel of the cover during coupling of the cover with the housing; and (d) retain the cover securely coupled to the housing during deployment of an airbag from the module. Additionally, the configuration of the housing provides flexibility in the manner in which the housing can be formed, because it enables the housing to be formed e.g. as a metal casting, a metal stamping, and a molded article.

19 Claims, 7 Drawing Sheets

US 6,942,244 B2

COVER AND HOUSING STRUCTURE FOR AN AIRBAG MODULE

FIELD OF THE INVENTION

The present invention relates to structure and method for forming an airbag module. The present invention relates particularly to an airbag cover and housing designed to be coupled together in forming an airbag module, and to a method of coupling the airbag cover with the housing member.

BACKGROUND OF THE INVENTION

An airbag module typically comprises a housing and cover that are coupled together and form a cavity in which an airbag is stored. A gas generator is coupled to the housing and is in fluid communication with the interior of the airbag. At the onset of a vehicle collision, the gas generator is actuated and directs gas rapidly into the airbag, forcing the airbag out of the cavity and rapidly inflating the airbag in front of a vehicle occupant. In a driver side airbag, the airbag module is typically located in the steering wheel. In a passenger side airbag, the airbag module is typically located at a selected location in the vehicle instrument panel.

In a known driver side airbag module the housing is formed of steel and the airbag cover is designed to fit tightly over a portion of the housing. The airbag cover is formed of an elastomeric material that can deform elastically as the cover and housing are being fit together. The housing is a cast metal member with a plurality of integrally formed hooks. The cover has a plurality of openings, each of which fits over a respective hook when the cover is coupled with the housing. The cover also includes a resilient flap behind each opening, and when the openings in the cover are being fit over the hooks, the resilient flaps engage the backsides of the hooks, and are slightly compressed as the openings are fit over the hooks. The cover is then pulled back slightly, to relieve the compression on the flaps and to finally position the cover on the housing.

When an airbag is being deployed, there are parts of the cover that must tear apart or partially separate to enable the airbag to deploy and inflate. On the other hand, the parts of the cover that are coupled to the hooks of the housing should remain coupled to the housing as the airbag is deployed.

SUMMARY OF THE INVENTION

The present invention provides a new and useful construction for an airbag cover and housing, and an assembly technique for coupling the airbag housing and cover to form an airbag module. The cover and housing construction of the present invention is believed to improve various aspects of the assembly technique as the cover and housing are being connected to form the airbag module. In addition, the present invention is designed to reduce the likelihood of deformation of certain parts of the cover during the assembly process, and to provide a strong and secure coupling between cover and housing which allows deployment of the airbag, but resists separation of the housing and cover as the airbag is being deployed. Still further, the present invention provides flexibility in the construction of the housing, because it enables the housing to be constructed in various ways, e.g. as a metal casting, a metal stamping, and a molded article.

According to the present invention an airbag cover and housing are configured so that the cover is tightly fit over the housing as the cover is coupled to the housing to form the airbag module. The housing has at least one hook and at least one retainer, each formed in one piece with the housing. The hook and the retainer are oriented toward each other and are configured to capture a part of the airbag cover between them, to couple the airbag cover with the airbag housing. The housing preferably includes an array of hooks and retainers configured to (a) enable the cover to be tightly fit over the housing (b) capture parts of the cover between the hooks and the retainers, (c) prevent over-travel of the cover as the cover is being coupled with the housing, and (d) retain the cover securely coupled to the housing during deployment of an airbag from the module.

These and other features of the present invention will become further apparent from the following detailed description and the accompanying drawings.

DETAILED DESCRIPTION OF THE INVENTION

The present invention provides an airbag cover and housing designed to be coupled together in forming an airbag module, and to a method of coupling the airbag cover with the housing member. The invention is described below in connection with a driver side airbag module, but it will be clear how the principles of the invention can be used with other airbag modules.

Figure 1:
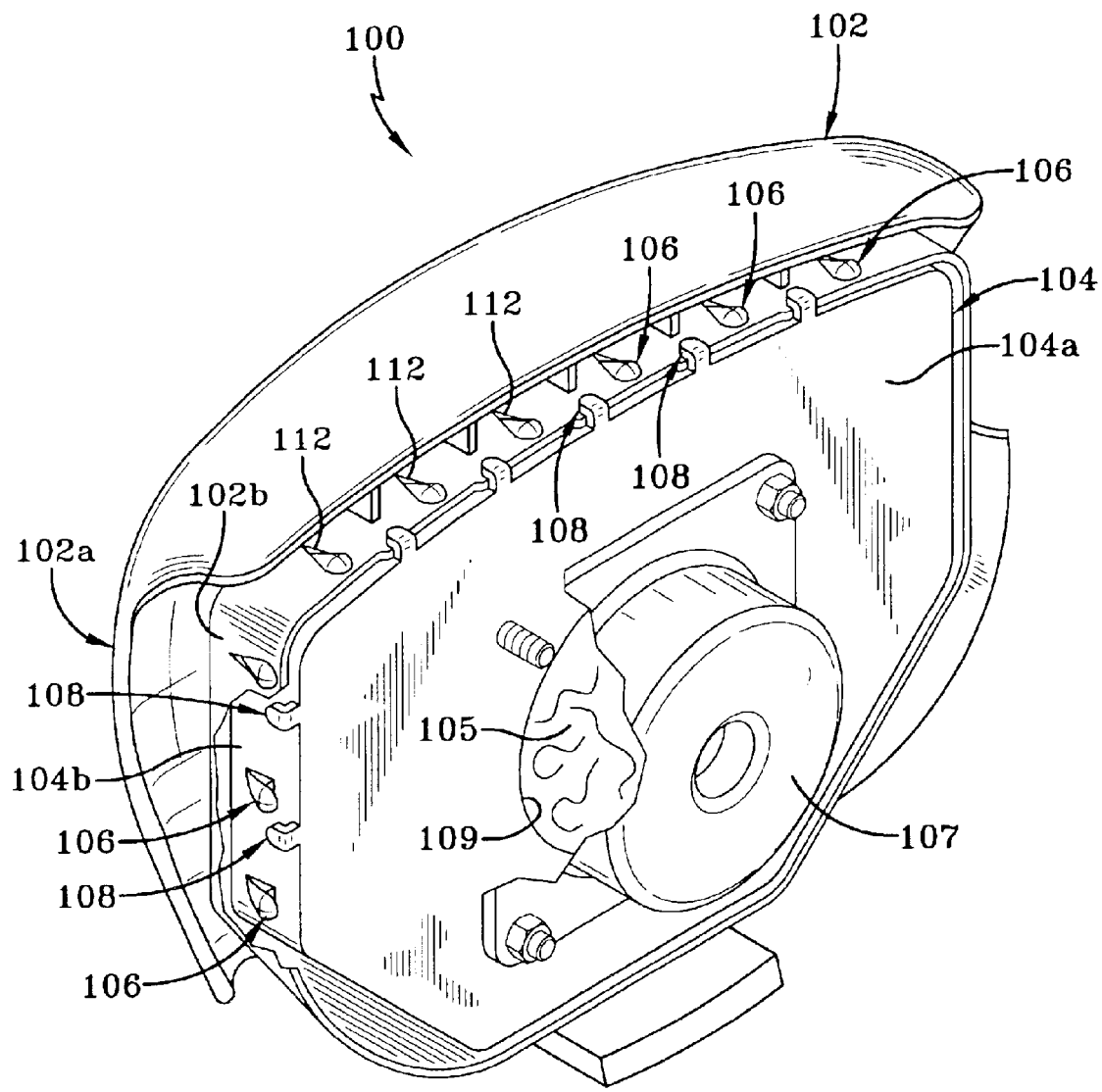
FIG. 1 is a perspective view of the rear of an airbag module according to one embodiment of the present invention, with portions of the housing and gas generator cut away.

In FIG. 1, an airbag module 100 comprises a cover 102 and a housing member 104 which are coupled together to form a cavity for storing an inflatable airbag (shown schematically at 105). A gas generator (shown schematically at 107) is coupled to the housing member 104, and communicates with the airbag through an opening 109 in the housing member 104. At the onset of a vehicle collision the gas generator is designed to direct gas into the inflatable airbag to deploy the airbag into a vehicle occupant compartment. The front wall 102a of the cover has a tear seam (not shown). The tear seam permits the cover to separate in a well-known manner, to allow the airbag to deploy and rapidly inflate in front of an occupant. The structure of a vehicle airbag, the tear seam in the cover, the manner in which an airbag can be stored in the airbag cavity and deployed in front of a vehicle occupant, and the structure of a gas generator which can be used in the airbag module are well known to those in the art, and should not require further explanation.

The airbag cover 102 is coupled with the housing member 104 by means of the structure and technique of the present invention. FIGS. 1–4 show a housing member 104 that can be formed as a cast metal member or a molded plastic member. In FIGS. 1–4, the housing member 104 includes a back wall 104a, and a peripheral sidewall 104b extending forward from the back wall 104a. The cover 102 has a peripheral sidewall 102b that extends rearward from the front wall 102a, and is configured to fit tightly over the peripheral sidewall 104b of the housing member. According to the present invention, the peripheral side wall 104b of the housing member has an array of hooks 106 and retainers 108 formed in one piece with the peripheral side wall 104b, and the cover has an array of openings 112 that fit over the hooks 106 as the peripheral side wall 102b of the cover is fit over the peripheral side wall 104b of the housing member 104.

Figure 2:
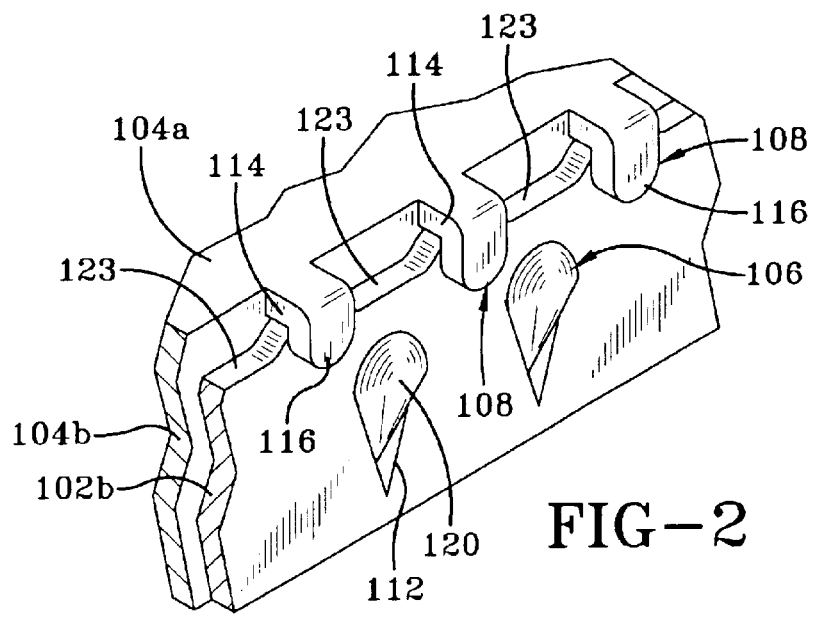
FIG. 2 is a perspective view of a portion of the housing and cover of the airbag module of FIG. 1, and illustrating one configuration for a hook according to the present invention.
Figures 3, 4:
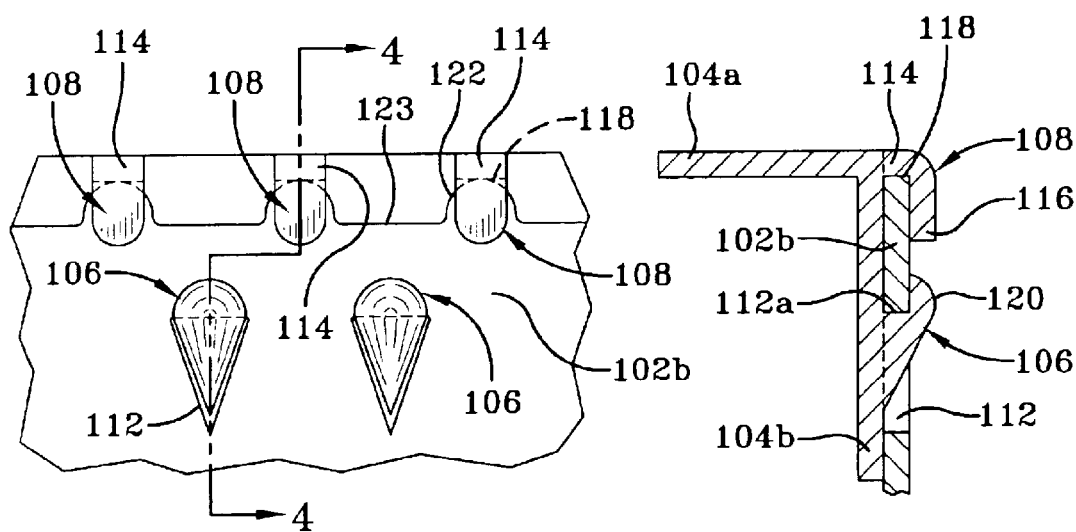
FIG. 3 is a plan view of a portion of the module of FIG. 1, with an airbag cover coupled to the housing.
FIG. 4 is a cross section of FIG. 3, taken from the direction 4—4, and illustrating how a part of an airbag cover is captured between a hook and retainer of the airbag module, according to the principles of the present invention.
Figure 5:
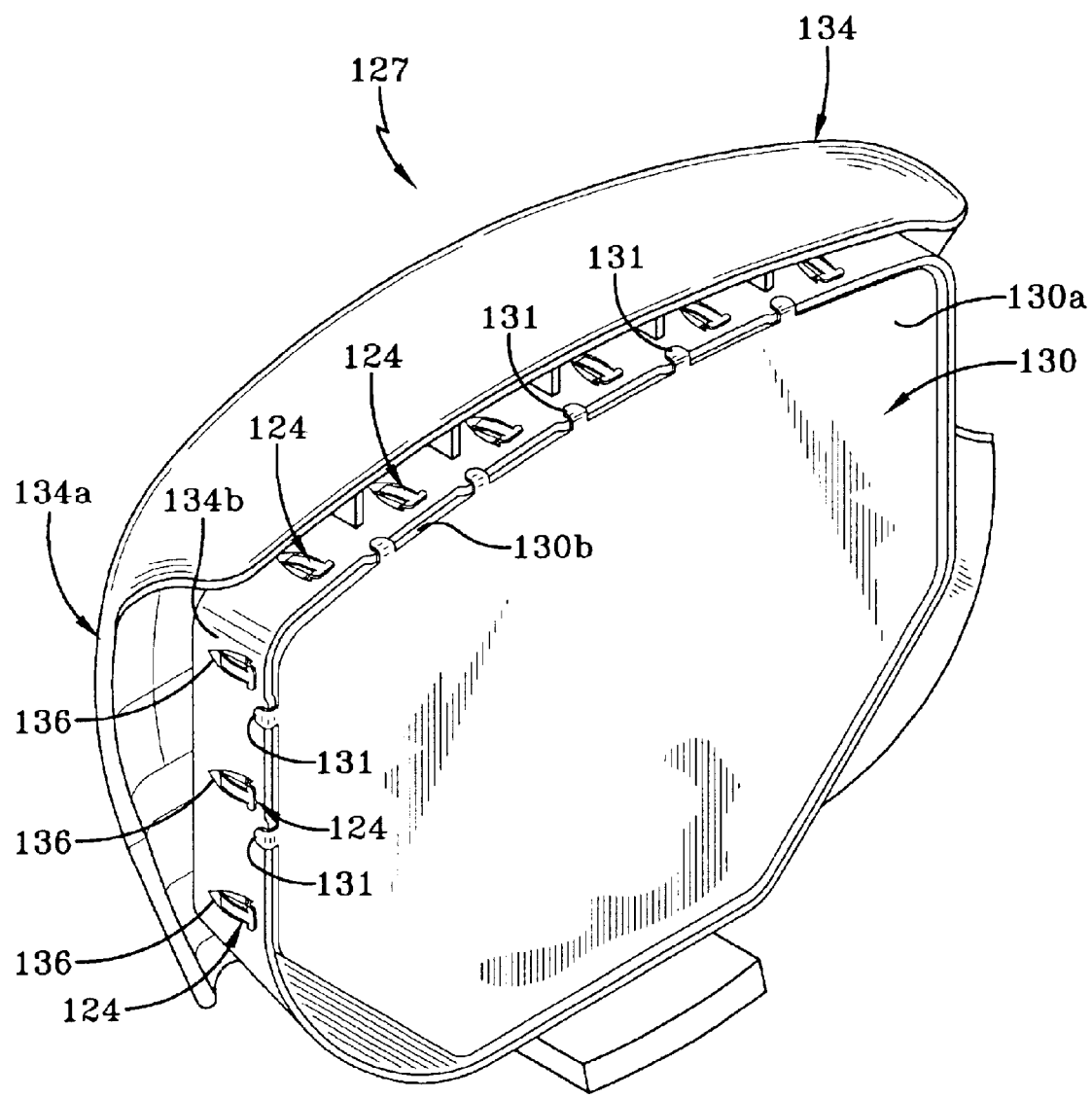
FIG. 5 is a perspective view of the rear of an airbag module according to another embodiment of the present invention, with portions omitted.
Figure 7:
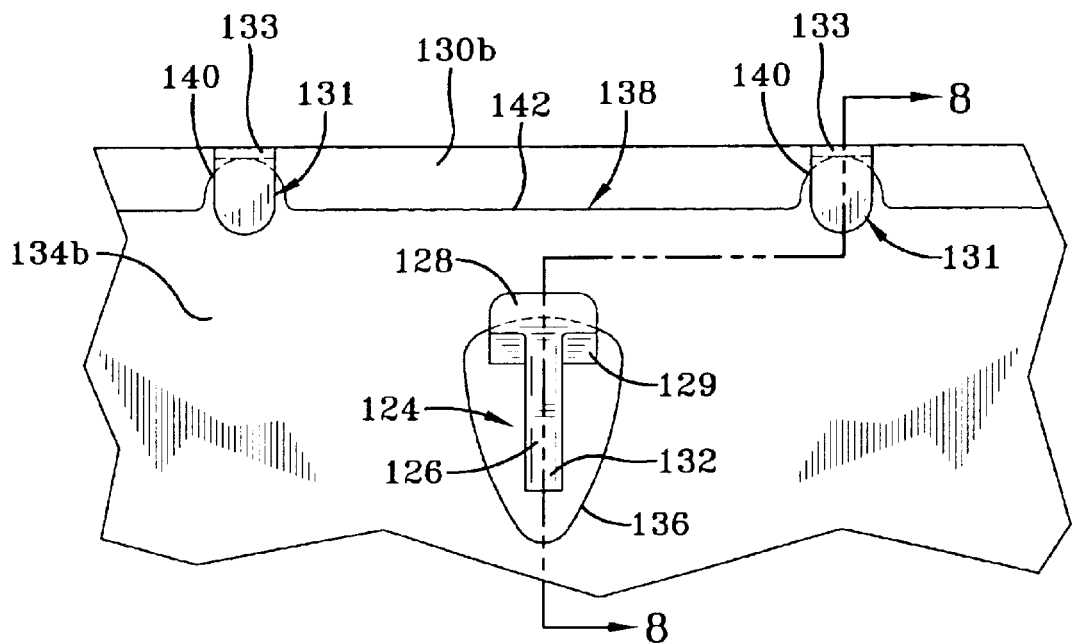
FIG. 7 is a plan view of a portion of the module of FIG. 5, with an airbag cover coupled to the housing.
Figure 6:
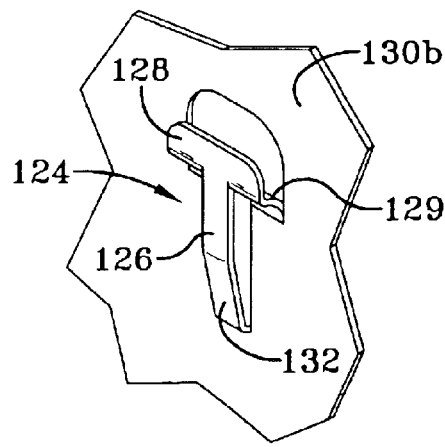
FIG. 6 is a perspective view of a portion of the housing of the airbag module of FIG. 5, and illustrating another configuration for a hook according to the present invention.
Figure 8:
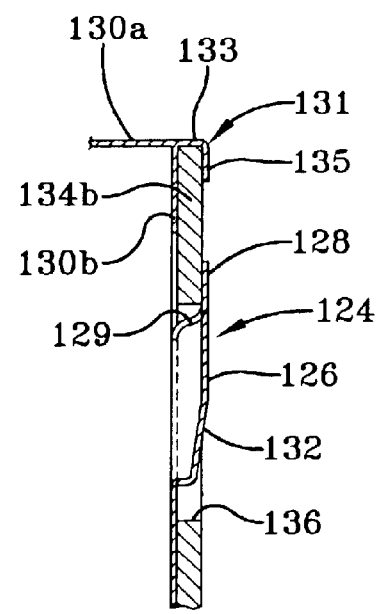
FIG. 8 is a cross section of FIG. 7, taken from the direction 8—8, and illustrating how a part of an airbag cover is captured between the hook and retainer of the airbag module of FIG. 5, according to the principles of the present invention.
Figure 9:
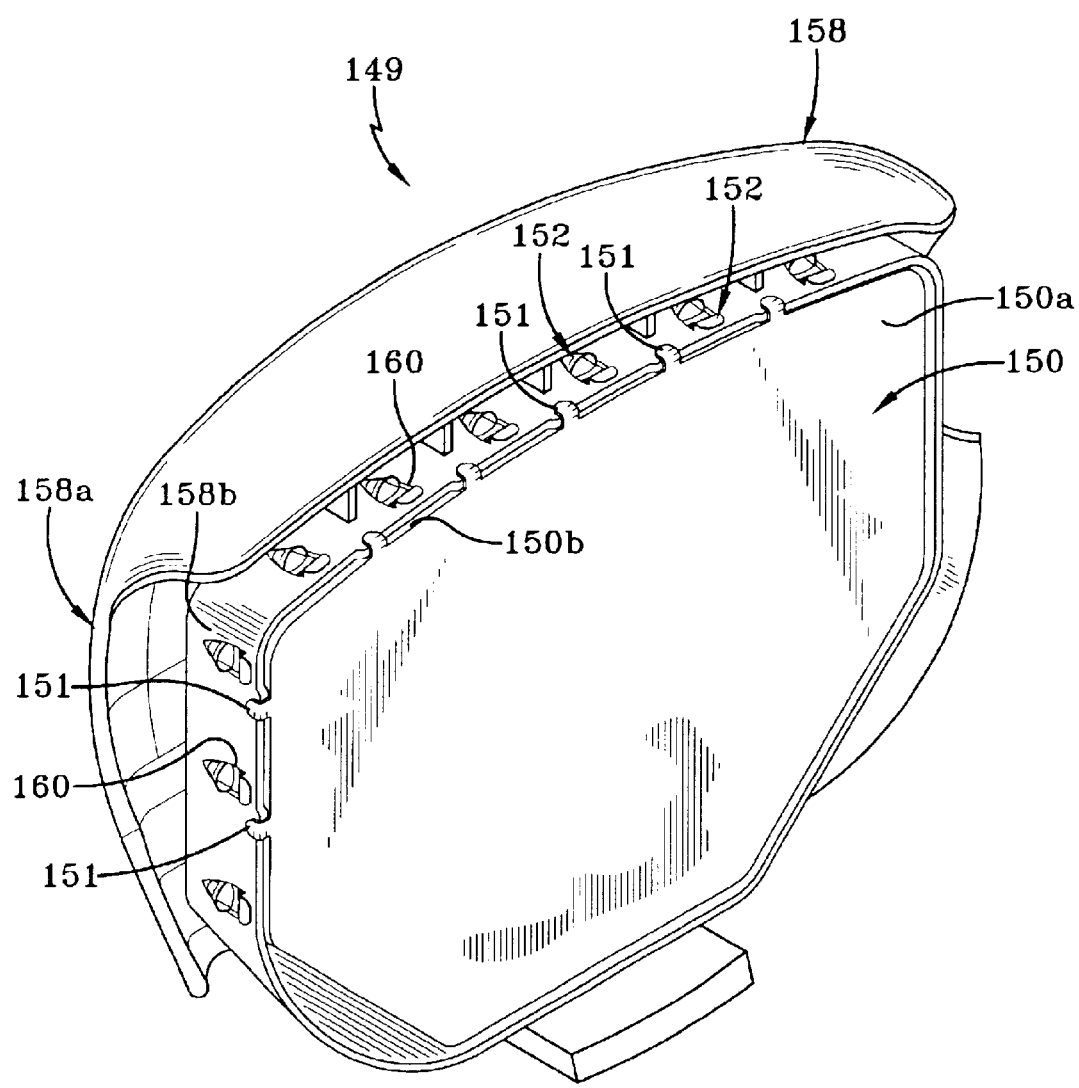
FIG. 9 is a perspective view of the rear of an airbag module according to still another embodiment of the present invention, with portions omitted.
Figure 10:
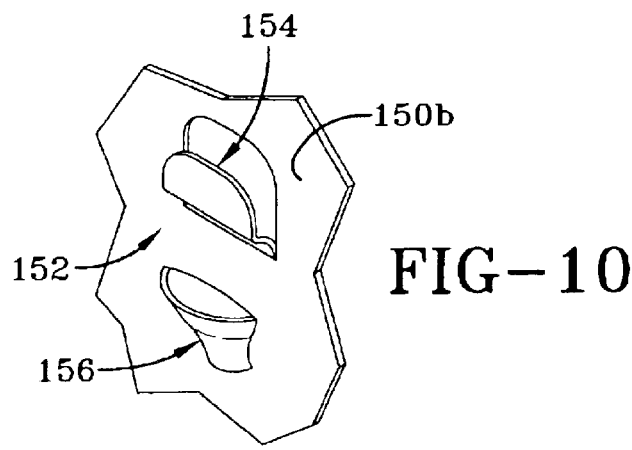
FIG. 10 is a perspective view of a portion of the housing of the airbag module of FIG. 9, and illustrating still another configuration for a hook according to the present invention.
Figure 11:
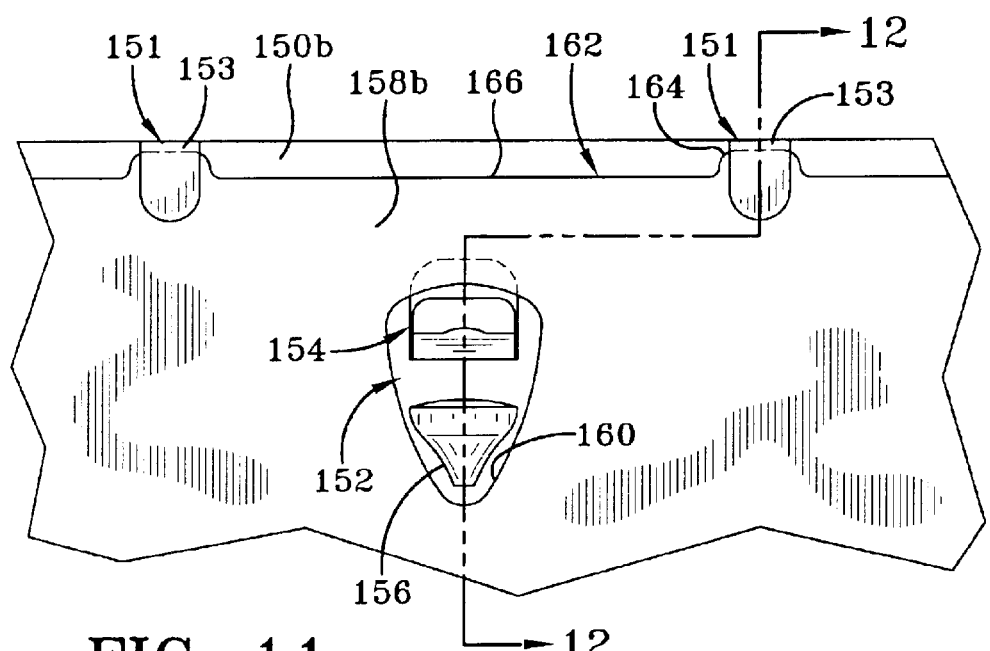
FIG. 11 is a plan view of a portion of the module of FIG. 9, with an airbag cover coupled to the housing.
Figure 12:
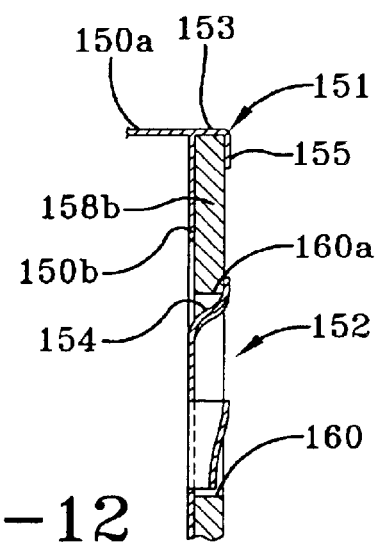
FIG. 12 is a cross section of FIG. 11, taken from the direction 12—12 and illustrating how a part of an airbag cover is captured between the hook of and retainer of the airbag module of FIG. 9, according to the principles of the present invention.

In FIGS. 1–4, the housing member 104 is formed, e.g. as a cast metal member. The housing member 104 includes an array of hooks 106 and retainers 108 formed in one piece with the cast metal housing member 104. The hooks 106 and the retainers 108 are disposed about the peripheral sidewall 104b of the housing member 104. The hooks 106 and retainers 108 are staggered in relation to each other about the peripheral sidewall 104b (see e.g. FIGS. 1, 3). Moreover, the hooks and retainers are oriented toward each other (as illustrated in FIG. 4) and are configured to capture the sidewall 102b of the airbag cover 102 between them, to couple the airbag cover 102 with the airbag housing member 104.

The airbag cover 102 is formed of elastically deformable material, and the peripheral side wall 102b of the cover is configured to be tightly fit over the peripheral side wall 104b of the housing member 104 as the airbag cover 102 is being coupled with the housing member 104. The metal housing member 104 is relatively rigid compared to the cover 102, so that the peripheral side wall 102b of the airbag cover 102 can deform elastically as the peripheral side wall 102b of the cover is being fit over the peripheral side wall 104b of the housing member 104. The peripheral side wall 102b of the cover 102 includes a plurality of openings 112, each of which is configured to extend over and about a respective hook 106, as the peripheral side wall 102b of the cover is being fit over the peripheral side wall 104b of the housing member 104, to couple the cover to the housing member. When the airbag cover 102 has been coupled to the housing member 104, each hook 106 in the housing member extends through a respective opening 112 in the cover 102, and the peripheral side wall 102b of the cover is effectively captured between the arrays of hooks 106 and retainers 108 of the retainer, to couple the cover 102 to the housing member 104.

As seen in FIGS. 1–4, the hooks 106 and the retainers 108 are oriented toward each other. Each retainer 108 includes (i) a stop portion 114 that extends away from the housing member 104 and (ii) a lip 116 at the distal end of the stop portion. The stop portions 114 of the retainers 108 can engage a leading edge 118 of the airbag cover 102 when the cover is being fitted over the housing member 104. Additionally, the lips 116 of the retainers co-operate with the hooks to effectively capture the peripheral sidewall 102b of the cover between the hooks and the retainers when the cover is coupled with the housing member. Still further, the structure of the peripheral side walls 102b, 104b of the cover and housing member, respectively, is designed to prevent the peripheral side wall 102b of the cover from separating from the peripheral side wall 104b of the housing member 104 under the forces applied to those members during airbag deployment.

The hooks 106, besides being oriented toward the retainers 108 have outer surfaces 120 which define ramps over which the airbag cover 102 can ride as the airbag cover is being coupled with the housing member 104. Thus, as the peripheral side wall 102b of the cover is being tightly fitted over the peripheral side wall 104b of the housing member 104 the airbag cover 102 can stretch elastically and ride over the ramps 120 formed on the hooks 106 until the leading edge 118 of the airbag cover engages the stops 114 of the retainers. As explained further below, when the leading edge 118 engages the stops 114, portions of the leading edge of the cover become compressed against the stops 114 as the openings 112 in the airbag cover fully receive the hooks 106 of the housing. The cover can then be released, and its elastic properties will allow it to react against the stops 114 and expand elastically to a condition in which (a) the leading edge of the cover is pressed against the stops and (b) the front portions 112a of the openings are pressed against the hooks 106, so that the peripheral sidewall 102b of the cover is effectively captured between the hooks 106 and the retainers 108.

As illustrated in FIGS. 1–4, the plurality of hooks 106 is in staggered relation to the plurality of retainers 108 about the peripheral sidewall 104b of the housing member 104. Thus, as parts of the peripheral sidewall 102b of the cover ride over the hooks 106, other parts of the peripheral side wall 102b of the cover (i.e. those parts located between the openings 112) remain close to the surface of the housing, thereby assuring that the leading edge 118 of the cover will contact the stops 114 of the retainers, and prevent over travel of the cover as the cover is being fitted onto the housing member 104.

In addition, as seen in FIGS. 2, 3, the leading edge 118 of the cover preferably has a periodic wave profile with a series of spaced crests 122 and troughs 123 disposed between the crests 122. The periodic wave profile helps control the stiffness, as well as the elastic properties, of the cover, and the crests at the leading edge of the cover provide structure that is compressed against the retainers 108, as the cover is being coupled to the housing. The crests 122 and the openings 112 are staggered, such that the crests 122 are aligned with the retainers 108 when the openings 112 are aligned with the hooks 106.

As set forth above, in the embodiment of FIGS. 1–4, the housing member 104, the hooks 106 and the retainers 108 are integrally formed in one piece as a cast metal member. FIGS. 1–4 illustrates one preferred configuration of the hooks 106 when the housing 104 is formed as a cast metal member. A similar configuration for the hooks and retainers can be provided if the housing member 104 is formed as a molded plastic member.

FIGS. 5–8 illustrate an airbag module 127 with an alternative configuration for a metal housing member 130. In the module 127, a gas generator and an opening in the housing member, which would be similar to those features of the previous embodiment, are omitted. The metal housing member 130 has a back wall 130a and a peripheral sidewall 130b as in the previous embodiment. The housing member 130 has an array of spaced retainers 131, which have stops 133 and lips 135 that are configured similar to the retainers of the previous embodiment. In FIGS. 5–8 an array of hooks 124 are stamped in the peripheral sidewall 130b of the housing member 130. Each hook 124 has a central portion 126 and transverse portion 128 at the leading end of the central portion (the "leading" end being closer to the array of retainers 131 formed in the housing member 130). The transverse portion 128 of each hook has stamped supports 129 that originate from different locations on the peripheral sidewall 130b of the housing than the central portion 126. The central portion 126 of each hook includes a ramp 132 over which a cover 134 can ride as the cover is being fitted over the housing member 130. The cover 134 is formed of elastically deformable material, and includes a front wall 134a and a peripheral sidewall 134b that is tightly fit over the peripheral sidewall 130b of the housing member, to couple the cover to the housing member. The peripheral sidewall 134b of the cover has tear drop shaped openings 136 and a leading edge 138 with a plurality of spaced crests 140 and troughs 142 that are similar to the previous embodiment. The openings 136 can fit over the hooks 124. The hooks 124 are staggered in relation to the retainers 131 of the housing member, and the openings 136 are staggered in relation to the crests 140 of the cover 134, such that as the cover is being fit onto the housing member, the crests 140 are aligned with the retainers 131 and the openings 136 are aligned with the hooks 124.

FIGS. 9–12 illustrate still another version of an airbag module 149 with an alternative configuration for a metal housing member 150. In the module 149, a gas generator and an opening in the housing member, which would be similar to those features of the previous embodiments, are omitted. The metal housing member 150 has a back wall 150a and a peripheral sidewall 150b as in the previous embodiments. Moreover the housing member has a plurality of spaced retainers 151, which have stops 153 and lips 155 that are configured similar to the previous embodiments. In FIGS. 9–12 an array of hooks 152 are stamped in the peripheral sidewall 150b of the housing member 150. Each hook 152 has a hook portion 154 and a spaced ramp portion 156 extending away from the peripheral sidewall 150b of the metal housing member. The ramp portions enable a cover 158 to ride over the hooks as the cover is being fitted over the housing member. The cover 158 is formed of elastically deformable material, and includes a front wall 158a and a peripheral sidewall 158b that is tightly fit over the peripheral sidewall 150b of the housing member, to couple the cover to the housing member. The peripheral sidewall 158b of the cover has tear drop shaped openings 160 and a leading edge 162 with a plurality of spaced crests 164 and troughs 166 that are similar to the previous embodiments. The openings 160 can fit over the hooks 152. The hooks 152 are staggered in relation to the retainers 151 of the housing member, and the openings 160 are staggered in relation to the crests 164 of the cover 158, such that as the cover 158 is being fit onto the housing member 150, the crests 164 are aligned with the retainers 151 and the openings 160 are aligned with the hooks 152.

In each of the embodiments of FIGS. 5–8 and 9–12, the retainers have the same configuration as the retainers of FIGS. 1–4, and are formed in one piece with the housing member. Moreover, openings in the cover are teardrop shaped, and are otherwise configured so that the hooks can fit completely through the openings, and front portions of the openings can be pressed against the hooks when the cover is coupled to the housing member. In each of the disclosed embodiments, the hooks and retainers are oriented toward each other, in the sense that they are configured to capture portions of the peripheral sidewall of the cover between them, as the cover is couples to the housing member.

The assembly process for forming an airbag module is the same for each of the disclosed embodiments. The airbag is inserted into the cover (the airbag may have a retainer ring as is well known to those in the art), and the cover is coupled with the housing member according to the principles of the present invention. The airbag and gas generator are coupled with the housing member, in a manner well known to those in the art, to form a completed module.

Figure 13A:
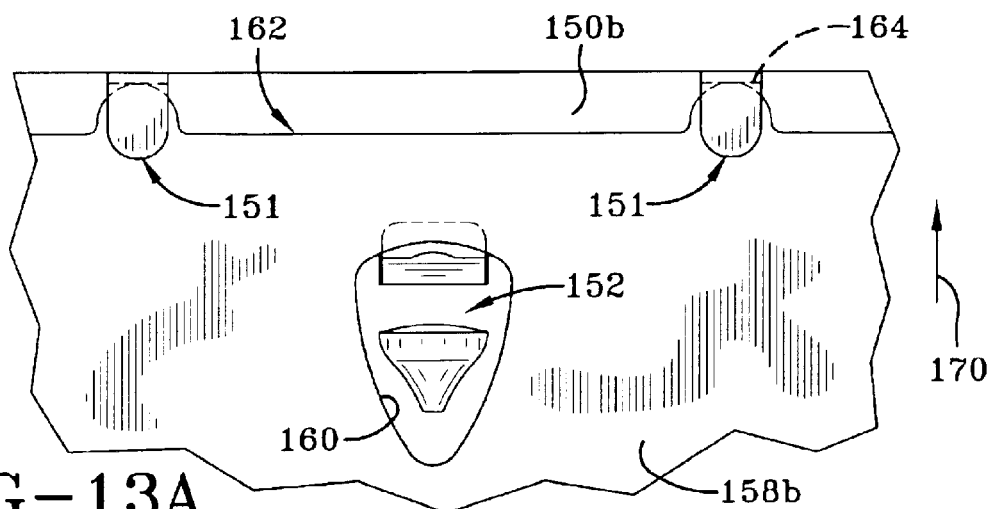
FIGS. 13a–13c schematically illustrate how an airbag cover is attached to a retainer, in forming the airbag module of FIGS. 9–12.
Figure 13B:
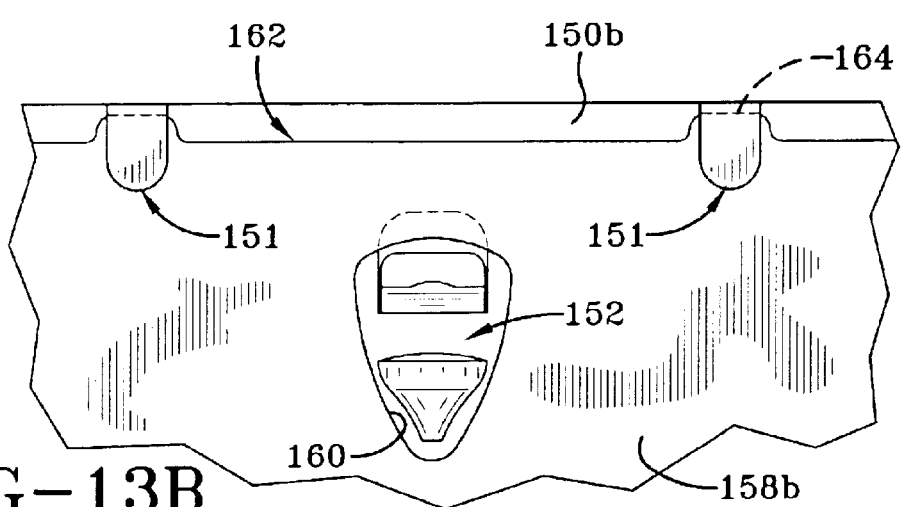
Figure 13C:
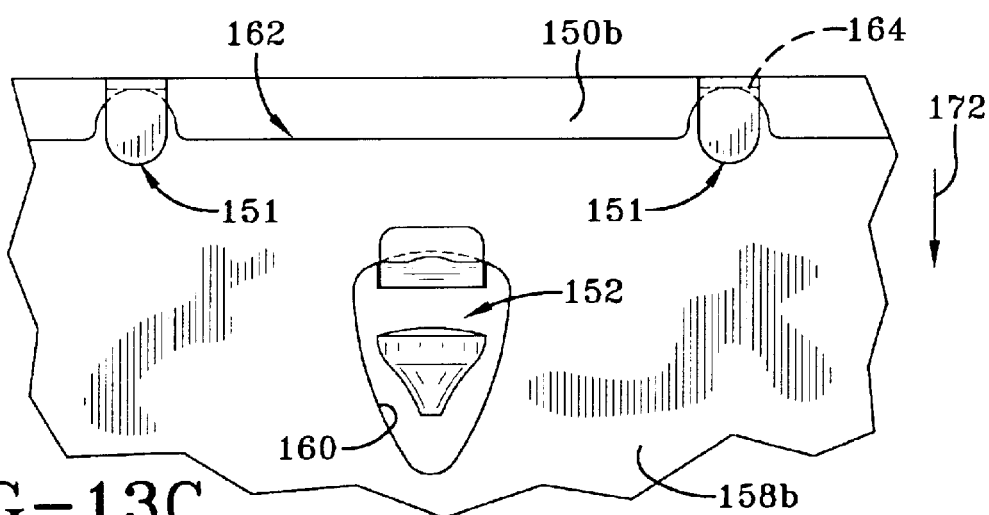

The manner in which a cover is tightly fit over a housing, to couple the cover with the housing, according to the principles of the present invention, is schematically illustrated an FIGS. 13A–13C. In FIGS. 13A–13C an airbag cover 158 and housing 150, constructed according to the embodiment of FIGS. 9–12, are coupled together. Specifically, the peripheral sidewalls 150b, 158b of the housing arid cover, respectively, are fit together such that the peripheral sidewall 158b of the cover moves relative to the peripheral side wall 150b in the direction shown by arrow 170. The relatively rigidity of the housing member 150 and the elastic deformation capability of the cover enables the cover stretch as it is inserted onto the housing. The cover is fit together with the housing member with the crests 164 at the leading edge 162 of the cover aligned with the retainers 151 of the housing member and the openings 160 in the cover aligned with the hooks 152 of the housing member (FIG. 13A). As the cover rides over the ramps of the hooks, the portions of the cover having the crests 164 remain tightly fit against the housing, so that the crests 164 engage the stop portions 153 of the retainers, to prevent over travel of the cover relative to the housing member. As the crests 164 at the leading edge of the cover engage the stop portions 153 of the retainers, the crests 154 are compressed (see FIG. 13B), and each opening 160 in the cover fits over a respective hook 152 of the housing. At that point, the pressure that forced the cover onto the housing is relaxed, and the compression on the crests of the cover will cause the cover to react against the stop portions 153 of the retainers and enable the peripheral sidewall 158b of the cover to expand between the retainers and the hooks (i.e. the side wall 158b of the cover will move relative to the side wall 150b of the housing in the direction illustrated by arrow 172). This causes the front portions 160a of the openings in the cover to be pressed against the hook portions 154 of the hooks 152, so that the peripheral sidewall 158b of the cover is effectively captured between the hooks 152 and the retainers 151 of the housing. Thus, as the cover is being tightly fit over the housing, (i) the cover will deform elastically as it rides over the ramps of the housing, (ii) the leading edge of the cover will engage the retainers and be compressed until the openings in the cover receive respective hooks of the housing and (iii) when the cover is release the cover can react against the retainers and expand between the hooks and retainers to capture the cover between the hooks and the retainers.

Thus, in each of the foregoing embodiments, the cover and housing member are configured to (a) enable the cover to be tightly fit over the housing member, (b) capture the peripheral side wall of the cover between the hooks and the retainers, (c) prevent over travel of the cover during coupling of the cover with the housing member, and (d) retain the cover coupled to the housing member during deployment of an airbag from the cavity.

Accordingly, the foregoing description provides an airbag cover and housing, and an assembly technique, which is designed to effectively and securely couple the airbag cover with the housing. Moreover, the configuration of the housing member is designed to provide flexibility in the ways in which the housing can be formed and still function in accordance with the principles of the present invention. With the foregoing disclosure in mind, there will be other modifications and developments that will be apparent to those in the art.

What is claimed is:

1. Apparatus for coupling an airbag cover having a peripheral sidewall with a an airbag housing member having a peripheral sidewall, comprising an array of hooks and retainers each formed in one piece with the peripheral sidewall of the airbag housing member with the hooks being in staggered relation to the retainers, the hooks and retainers oriented ward each other and being configured to capture a part of the airbag cover between them, to couple the airbag cover with the airbag housing member, wherein the airbag cover is formed of elastically deformable material and the peripheral sidewall of the airbag cover has an array of openings therein, each opening configured to fit over one of the hooks when the airbag cover is captured between the hooks and the retainers, the airbag cover is configured to be tightly fit over the housing member as the airbag cover is being coupled with the housing member, and the housing member is formed of relatively rigid material such the airbag cover can deform elastically as it is being coupled with the housing member and the airbag cover is being captured between the hooks and the retainers, the hooks have outer surfaces that define ramp portions over which the airbag cover will ride as the airbag cover is being coupled with the housing member, so that as the airbag cover is being coupled with the housing member (i) the cover will deform elastically as it rides over the ramp portions of the hooks (ii) a leading edge of the cover will engage the retainers and be compressed until the openings in the cove receive respective hooks of the housing and (iii) when the cover is released the cover will react against the retainers, and expand between the hooks and retainers to capture the cover between the hooks and the retainers.

2. The apparatus of claim 1, wherein the housing member and the cover when assembled define an airbag cavity for housing an airbag.

3. The apparatus of claim 1, wherein each retainer includes (i) a stop portion that extends away from the sidewall of the housing member and (ii) a lip at the distal end of the stop portion, the stop portions of the retainers being configured to engage the leading edge of the airbag cover when the cover is coupled with the housing member, and the lips of the retainers being oriented ward the hooks.

4. The apparatus of claim 3, wherein as the airbag cover is being coupled with the housing member portions of the leading edge of the airbag cover engage the stop portions of the retainers and enable the airbag cover to become captured between the hooks and the retainers when the hooks extend through the openings in the cover.

5. The apparatus of claim 1, wherein the airbag housing member, the hooks and the retainers are formed in one piece as a stamped metal member.

6. The apparatus of claim 1, wherein each of the hooks includes a central portion and a transverse portion at a leading end of the central portion, the central portion of each hook defining the ramp portion of the hook.

7. The apparatus of claim 1, wherein each of the hooks includes a hook portion and ramp portion spaced apart from the hook portion.

8. The apparatus of claim 1, wherein the airbag housing member, the hooks and the retainers are formed in one piece as a molded member.

9. The apparatus of claim 1, wherein the airbag housing member, the hooks and the retainers are formed in one piece as a cast metal member.

10. The apparatus of claim 1, wherein the leading edge of the cover has a periodic wave profile, with a plurality of spaced crests and troughs disposed between the spaced crests, and wherein the crests are staggered in relation to the openings in th cover; such that the crests are aligned with the retainers when the openings are fit over the hooks of the housing member.

11. The apparatus of claim 1, wherein the hooks, the retainers, the openings and the cover are configured to prevent over travel of the cover during coupling of the cover with the housing member, and retain the cover coupled to the housing member during deployment of an airbag.

12. A method of assembling an airbag cover with an airbag housing, comprising the step of:
  (a) providing a housing with a plurality of hooks and a plurality of retainers formed in one piece therewith, the plurality of hooks being oriented toward the plurality of retainers;
  (b) providing an airbag cover configured to be tightly fit over the housing to couple the airbag cover with the housing, the cover being formed of elastically deformable material, the housing being formed of relatively rigid material and the hooks defining ramps which are oriented toward the retainers, so that portions of the cover can ride over the ramps of the housing and deform elastically as the cover is being fit over the housing, the cover having openings, each of which is configured to receive a respective hook as the cover is being fit over the housing;
  (c) fitting the cover tightly over the housing until a leading edge of the cover engages the retainers, and the openings in the cover receive respective hooks of the housing; wherein
  (l) the cover will deform elastically as it rides over the ramps of the housing, (ii) the leading edge of the cove will engage the retainers and be compressed until the openings in the cover receive respective hooks of the housing and (iii) when the cover is released the cover will react against the retainers, and expand between the hooks and retainers to capture the cover between the hooks and the retainers.

13. The method of claim 12, wherein the leading edge has spaced crests and troughs disposed between the crests, and wherein the hooks and retainers of the housing are staggered in relation to each other, and the openings and crests of the cover are staggered in relation to each other and are oriented such that the crests of the cover are aligned with the retainers of the housing when the openings in the cover are fit over the hooks of the housing.

14. An airbag module comprising an airbag cover and housing member that form a cavity for an airbag, and characterized in that the housing member comprises a plurality of hooks and a plurality of retainers formed in one piece with the housing member, the hooks and retainers being oriented toward each other and being configured to capture a part of the airbag cover between them, to couple the airbag cover with the housing member, the hooks having outer surfaces that define ramp portions over which the airbag cover will ride as the airbag cover is being coupled with the housing member, an the hooks are staggered in relation to the retainers, wherein the housing member is relatively rigid and the airbag cover is elastically deformable and includes a plurality of openings, each of which is fit over a respective hook when the cover is coupled with the housing member, each retainer including (i) a stop portion that extends away from the housing member and (ii) a lip at the distal end of the stop portion, the stop portions of the retainers being configured to engage a leading edge of the airbag cover and the lips of the retainers being oriented toward the hooks so that the retainers co-operate with the hooks to capture the part of the cover between the hooks and the retainers when the cover is coupled with the housing member, and the leading edge of the cover has a periodic wave profile comprising a series of spaced crests and troughs disposed between the crests, and wherein the openings and the crests are in staggered relation to each other such that the crests of the cover are aligned with the retainers of the housing member when the openings in the cover are fit over the hooks housing member.

15. The airbag module of claim 14, wherein the housing member, the hooks and the retainers are formed in one piece as a stamped metal member.

16. The airbag module of claim 15, wherein each of the hooks includes a central portion and a pair of transverse portions at the leading end of the central portion, the central portion of each hook defining the ramp portion of the hook.

17. The airbag module of claim 15, wherein each of the hooks includes a hook portion and a ramp portion spaced apart from the hook portion.

18. The airbag module of claim 14, wherein the housing member, the hooks and the retainers are formed in one piece as a molded member.

19. The airbag module of claim 14, wherein the housing member, the hooks and the retainers are formed in one piece as a cast metal member.

* * * * *